W. A. LORENZ.
APPARATUS FOR FEEDING MOLTEN GLASS.
APPLICATION FILED AUG. 7, 1917.
1,300,180.
Patented Apr. 8, 1919.
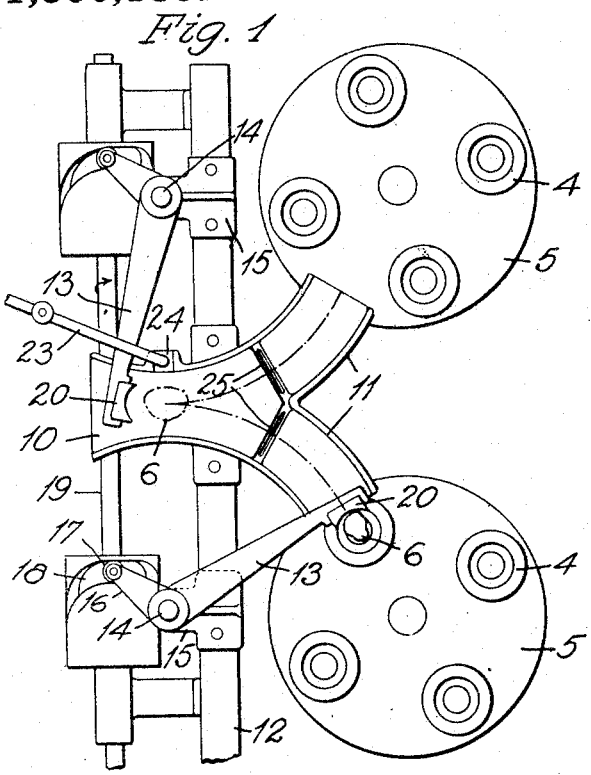
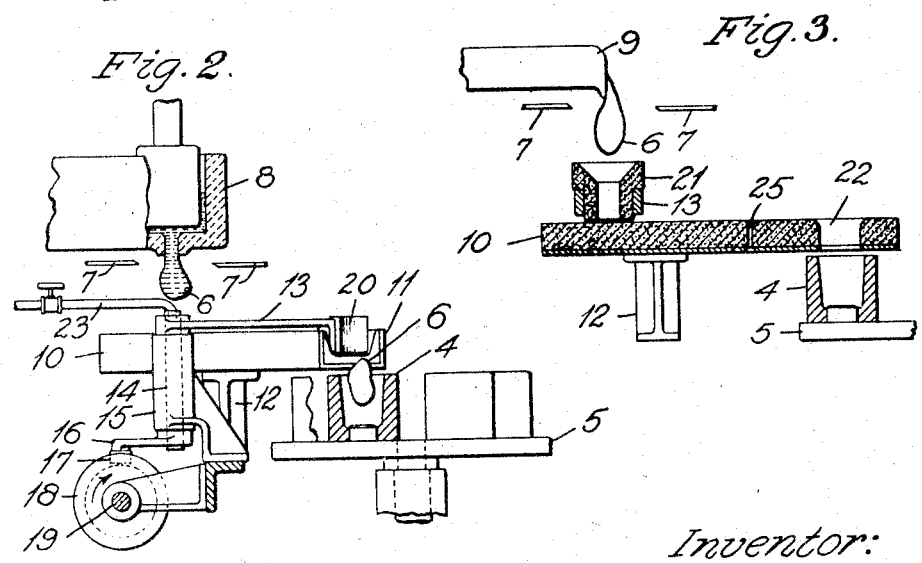
Witness:
S. S. Grotta
Inventor:
William A. Lorenz
by Wm. H. Honiss
Atty.

UNITED STATES PATENT OFFICE.

WILLIAM A. LORENZ, OF HARTFORD, CONNECTICUT, ASSIGNOR TO HARTFORD-FAIRMONT COMPANY, OF CANAJOHARIE, NEW YORK, A CORPORATION OF NEW YORK.

APPARATUS FOR FEEDING MOLTEN GLASS.

1,300,180.    Specification of Letters Patent.    Patented Apr. 8, 1919.

Application filed August 7, 1917. Serial No. 184,874.

*To all whom it may concern:*

Be it known that I, WILLIAM A. LORENZ, a citizen of the United States, residing at Hartford, in the county of Hartford and State of Connecticut, have invented new and useful Improvements in Apparatus for Feeding Molten Glass, of which the following is a specification.

The object of this invention is to provide a simple and effective means for transferring or transporting gathers of glass from gathering apparatus or other source of supply to the molds of one or more glass pressing or blowing machines in a horizontal or substantially horizontal plane, whereby the molds may be located at one side of and away from the gathering apparatus or source of supply, thus avoiding the necessity of bringing the molds beneath the glass outlet.

Figure 1 of the accompanying drawings shows a plan of a transferring apparatus which embodies the invention, the apparatus in this case being represented as designed to deliver gathers of molten glass alternately to the molds of two shaping machines. Fig. 2 shows a side elevation, with parts shown in section. Fig. 3 shows a vertical section of parts of a different form of the apparatus.

In the illustrations the shaping molds 4 are represented as mounted on rotary tables 5 of two glass blowing or pressing machines. The gathers 6 of molten glass are separated by the usual shear blades 7 from the source of supply which is discharged from the forehearth 8 or outlet spout 9 of a glass furnace or other container of molten glass. A conduit 10, preferably trough shaped, and suitably lined with refractory material is arranged in position to receive the gathers as they are separated from the source of supply. This conduit in the form shown, has two curved branches 11, one extending to a position above the path of the molds of one machine and the other extending to a position above the path of the molds of the other machine. The conduit and its branches are supported upon a beam 12 in a horizontal or substantially horizontal position.

For the purpose of transferring the gathers from the locality at which they are deposited on the conduit to the molds, pushers are provided. If but a single shaping machine is to be fed one pusher only is necessary, whereas if two machines are to be fed two pushers and a conduit having divergent branches will be provided, and the pushers will be arranged to operate alternately. For this purpose, in the design of apparatus illustrated in the drawings, arms 13 are attached to the upper ends of rock shafts 14, vertically supported in bearings 15, mounted on the supporting beam. On the lower ends of the rocker shafts are cam arms 16, carrying rolls 17, which engage in suitably cut cam grooves in the drums 18 which are fixed to a shaft 19. These cams are so timed that they swing one pusher and then the other pusher, for transferring successive gathers that drop onto the conduit from the source of supply, first to a mold of one machine and then to a mold of the other machine, which molds are brought into position to receive the gathers at the proper time. At the free ends of the pusher arms, there may be detachable blocks 20 of carbon or other refractory material. Instead of the open sided blocks shown in Figs. 1 and 2, the pushers may be funnel shaped, like the pushers 21 shown in Fig. 3, and instead of pushing the gathers off from the end of the conduit as shown in Figs. 1 and 2, an opening 22 may be made in the conduit over the path of the molds, as shown in Fig. 3.

For the purpose of lubricating the surface of the conduit a pipe 23, may be arranged to supply a small stream of water to the duct 24 which will direct the water onto the surface of the conduit at the locality upon which the gathers will be dropped. Or the surface may be sprayed with water or other liquid, in any convenient way. The lower surfaces of the pushers travel fairly close to the upper surface of the conduit. The conduit may have openings 25 through its bottom, for the purpose of allowing surplus water to escape.

With transferring apparatus designed according to the present invention the supply of glass need be only slightly above the level of the tops of the molds, no higher in fact than if the molds were carried directly beneath the outlet.

When the conduit is thus sprayed the gathers of glass rest upon a film of the water, or of steam generated from the water by the heat of the successive gathers, which not only lubricates the surface of the conduit, so that the gathers slide easily, but also insulates the gathers from the conduit surface, preventing the rapid transference of heat from the gathers to the conduit, and to the faces of the pushers 20 or 21, which may also be sprayed, or kept moist by the splashing of water, or be enveloped by the steam rising from the conduit surface.

The surface of the conduit may be flat, or it may be hollowed out along the desired path of travel of the gathers. With open sided pushers, like those of Figs. 1 and 2 it will not in all cases be necessary to move the pushers all the way to the delivery ends of the conduit branches, inasmuch as the pushers may be moved so as to impart momentum to the gathers sufficient to carry them to the molds. The delivery ends of the conduits may also be inclined or curved downwardly toward the molds, so that the gathers will come under the influence of gravity as they approach the molds.

In operation the pushers are moved back to a position behind the gather before the latter falls upon the conduit surface, whereupon the pusher moves forward, pushing the drops before it as far as may be necessary to propel the gather to the mold, returning to its back position in time for its succeeding gather. When two pushers are employed they work alternately upon the succeeding gathers, clearing each other in their divergent paths.

The invention claimed is:

1. An apparatus for transferring gathers of molten glass from a source of supply to the molds of a shaping machine, including a conduit having a substantially horizontal surface for supporting gathers of molten glass received from the source of supply, reciprocating means movable substantially horizontally along the conduit and advancing the gathers thereon, and mechanism for moving said means back and forth.

2. An apparatus for transferring gathers of molten glass from a source of supply to the molds of a shaping machine, including a conduit having a substantially horizontal surface for receiving and delivering gathers of molten glass from the source of supply, devices for wetting said conduit, reciprocating means movable substantially horizontally along the conduit from its receiving portion toward its delivery portion, and mechanism for moving said means back and forth.

3. An apparatus for transferring gathers of molten glass from a source of supply to the molds of a shaping machine, including a substantially horizontal conduit for receiving and delivering gathers of molten glass from the source of supply, oscillatory means movable substantially horizontally along and close to the upper surface of said conduit from its receiving portion to its delivery portion, and mechanism for oscillating said means.

4. An apparatus for delivering gathers of molten glass from a source of supply to the molds of shaping machines, including a substantially horizontal conduit for receiving and delivering gathers of molten glass from the source of supply, a plurality of means movable substantially horizontally along the upper surface of said table from its receiving portion to different delivery portions, and mechanism for moving said means alternately.

5. An apparatus for transferring gathers of molten glass from a source of supply to molds of shaping machines, comprising a substantially horizontal conduit for receiving and delivering gathers of molten glass from the source of supply, a plurality of oscillatory means movable substantially horizontally along and close to the upper surface of said conduit from its receiving portion to different delivery portions, and mechanism for oscillating said means alternately with each other.

6. An apparatus for transferring gathers of molten glass from a source of supply to the molds of a shaping machine, comprising a trough shaped conduit for receiving and delivering gathers of molten glass from the source of supply, means movable substantially horizontally along and near the upper surface of said conduit from its receiving portion to its delivery portion, and mechanism for moving said means back and forth.

7. An apparatus for transferring gathers of molten glass from a source of supply to the molds of shaping machines, comprising a trough shaped conduit having trough shaped delivery branches diverging from each other, means for each branch movable substantially horizontally along and near the upper surface of said conduit from the receiving locality toward the respective delivery portion of the branches, and mechanism for moving said means back and forth.

8. An apparatus for transferring gathers of molten glass from a source of supply to the molds of a plurality of shaping machines, comprising a substantially horizontal conduit for receiving and delivering gathers of molten glass from the source of supply, a plurality of pushers movable substantially horizontally along and near the upper surface of said conduit from the receiving locality toward the delivery ends thereof, and mechanism for moving said pushers alternately back and forth.

9. An apparatus for transferring gathers of molten glass from a source of supply to the molds of a shaping machine, comprising a substantially horizontal conduit for receiving and delivering gathers of molten glass from the source of supply, said conduit having an opening through it between its receiving and delivering portions, devices for wetting said conduit, means movable substantially horizontally along and near the upper surface of said conduit from its receiving portion to its delivering portion, said means passing over the said opening, and mechanism for moving said means back and forth.

10. In an apparatus for handling gathers of molten glass, the combination with a source of supply, and with molds for receiving the gathers, of a horizontally arranged conduit, transferring means movable back and forth over the conduit, and mechanism for actuating said transferring means.

Signed at Hartford, Connecticut, this 6th day of August, 1917.

WILLIAM A. LORENZ.